United States Patent [19]

Ito

[11] Patent Number: 5,572,365

[45] Date of Patent: Nov. 5, 1996

[54] ZOOM LENS SYSTEM

[75] Inventor: Takayuki Ito, Tokyo, Japan

[73] Assignee: Asahi Kogaku Kogyo Kabushiki Kaisha, Tokyo, Japan

[21] Appl. No.: 291,892

[22] Filed: Aug. 17, 1994

[30] Foreign Application Priority Data

Aug. 18, 1993 [JP] Japan .................................. 5-203945

[51] Int. Cl.$^6$ ..................................... G02B 15/14
[52] U.S. Cl. ......................... 359/677; 359/679; 359/684; 359/686; 359/689
[58] Field of Search .................................. 359/677, 679, 359/684, 686, 689

[56] References Cited

U.S. PATENT DOCUMENTS

| 4,978,204 | 12/1990 | Ito ........................................... | 359/689 |
| 5,148,321 | 9/1992 | Goto et al. ............................... | 359/689 |
| 5,233,472 | 8/1993 | Haraguchi et al. ..................... | 359/694 |
| 5,260,833 | 11/1993 | Ito et al. ................................. | 359/689 |

FOREIGN PATENT DOCUMENTS 2256015  10/1990  Japan .

*Primary Examiner*—Georgia Y. Epps
*Assistant Examiner*—Evelyn A. Lester
*Attorney, Agent, or Firm*—Greenblum & Bernstein P.L.C.

[57] ABSTRACT

A zoom lens system has at least three lens groups in which two lens groups are moved together during the zooming operation. One of the two lens groups moved has a small degree of contribution to the variation of magnification and is referred to as lens group $\alpha$. The other lens group moved has a large degree of contribution to the variation of magnification and is referred to as lens group $\beta$. Lens groups $\alpha$ and $\beta$ have focusing sensitivities $K\alpha$ and $K\beta$ of different signs on the telephoto extremity, and the relationships:

$$12 < |K\beta|, \quad (1)$$

and $$-0.5 < K\alpha/K\alpha < -0.1. \quad (2)$$

7 Claims, 10 Drawing Sheets

ZOOM LENS SYSTEM

BACKGROUND OF THE INVENTION

1. Field of the Invention

The present invention relates to a zoom lens system having a high zoom ratio, and more precisely, relates to a physically small zoom lens having a high zoom ratio more than 3, that can be advantageously used for a compact camera in which the back-focal distance is restricted.

2. Description of the Related Art

In a known zoom lens for a compact camera, having a high degree of magnification and a small length for the whole lens system, when set at a long focal length the focusing sensitivity (ratio of the displacement of the focal point to an error in displacement of the lens groups in the optical axis direction) at the long focal length is very large. This means that the focal point can deviate greatly from the film surface due to a small error in the displacement of the lens groups, thus resulting in a deterioration in the image quality. To resolve this problem, the present invention provides a zoom lens comprised of three lens groups including a first positive lens group, a second positive lens group, and a third negative lens group. The first and third lens groups are moved together (e.g., Japanese Un-examined Patent Publication No.Hei 2-256015). However, the variable power (magnification) of the zoom lens is approximately 2.5, and accordingly, there is still a need to increase the variable power.

SUMMARY OF THE INVENTION

It is an object of the present invention to provide a high-powered physically small zoom lens system with a degree of magnification greater than 3, but a small focusing sensitivity, for use in a compact camera, in which the overall lens length when set at the long focal length position has to be small.

To achieve the object mentioned above, according to an aspect of the present invention, there is provided a zoom lens system of at least three lens groups. Two of the lens groups are moved together, keeping the distance between the two groups constant during the zooming operation. One of the two lens groups moved has a small degree of contribution to the variation of the magnification and is referred to as a lens group $\alpha$, and the other lens group has a large degree of contribution to the variation of the magnification and is referred to as a lens group $\beta$. The lens groups $\alpha$ and $\beta$ have focusing sensitivities $K\alpha$ and $K\beta$ with different signs so that they satisfy the following relationships:

$$12<|K\beta| \tag{1}$$

$$-0.5<K\alpha/K\beta<-0.1 \tag{2}$$

where "$K\alpha$" represents the focusing sensitivity of the lens group $\alpha$ at the telephoto extremity position; and, "$K\beta$" represents the focusing sensitivity of the lens group $\beta$ at the telephoto extremity position.

"Focusing sensitivity" refers to a ratio of displacement (or deviation) of the focal point to an error in the displacement of the associated lens group in the optical axis direction. In other words, the focusing sensitivity of a lens group is the sensitivity of the focus displacement of the focal point relative to the displacement of the focusing lens group. If the focusing sensitivity is large, there is a large displacement in the focal point caused by a small displacement of the lens group. The "degree of contribution" to the variation of the magnification refers to a variation of the lateral magnification per unit displacement of the lens group. In the present invention, the lens group with a small degree of contribution is referred to as lens group $\alpha$ and the lens group with a large degree of contribution is referred to as lens group $\beta$.

Preferably, the lens groups $\alpha$ and $\beta$ further satisfy the following relationship:

$$9<|K\alpha+K\beta|<20 \tag{3}$$

In an alternative embodiment, when operating to a physically smaller zoom lens system, formulae (1) and (3) are replaced by the following formulae (1') and (3'):

$$14<|K\beta| \tag{1'}$$

$$10<|K\alpha+K\beta|<20 \tag{3'}$$

In this embodiment, the lens group $\beta$ has a large power and accordingly, is preferably made as an aspheric lens.

Preferably, the following relationship is satisified:

$$3.3<m_T\beta<6 \tag{4}$$

$$2.5<m_T\beta/m_w\beta<4 \tag{5}$$

where "$m_T\beta$" represents the lateral magnification of the lens group $\beta$ at the telephoto extremity position; and "$m_w\beta$" the lateral magnification of the lens group on the wide angle extremity.

To simplify the mechanical arrangement of the zoom lens system, it is preferable that the focusing operation is carried out by a lens group other than the lens group a or the lens group $\beta$.

The present disclosure relates to subject matter contained in Japanese patent application No. 5-203945 (filed on Aug. 18, 1993) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

If a high-powered zoom lens system is miniaturized, the focusing sensitivity of a lens group or groups which mainly contribute to the magnification change, dramatically increases as the magnification increases. To prevent this, a first embodiment of the present invention provides two lens groups, which have focusing sensitivities of different signs are mechanically associated to move together during the zooming to optically reduce the focusing sensitivity. This technical idea can be easily achieved using a simple mechanism and becomes more effective as the degree of magnification increases.

Formula (1) specifies the focusing sensitivity of the lens group β, which mainly functions to vary the magnification, on the long focal length side. If the value of the formula (1) is less than the lower limit, it is impossible to satisfy both the requirements of an increase of magnification and a miniaturization of a zoom lens. In conventional zoom lenses, the value of the formula (1) is below the lower limit.

Formula (2) specifies the degree of reduction of focusing sensitivity when the lens groups α and β are integrally moved. If the value of formula (2) is greater than the upper limit, the focusing sensitivity is at best 10%. Conversely, if the value of the formula (2) is less than the lower limit, focusing sensitivity can be effectively reduced. However, the power of lens group β, and the lens group α are increased, so that it is difficult to correct the resulting aberration.

Formulae (3), (4) and (5) specify the requirements to create a zoom lens for a compact camera with a zoom ratio greater than 3. If the value of formula (3) is greater than the upper limit, even if the lens groups α and β are moved together, there is an unacceptable displacement of the focus in the lens barrel of a conventional compact camera creating a large deviation between the film surface and the image surface, resulting in a deterioration of image quality. If the value of formula (3) is less than the lower limit, the focusing sensitivity can be effectively reduced, but the zoom ratio is less than 3.

Formulae (4) and (5) specify the lateral magnification and zoom ratio of the lens group β on the telephoto. If the values of formulae (4) and (5) are greater than their respective upper limits, focusing sensitivity increases sharply. Conversely, if the values are less than their respective lower limits, it is difficult to increase the variable power of the whole lens system.

First Embodiment

Figure 1:
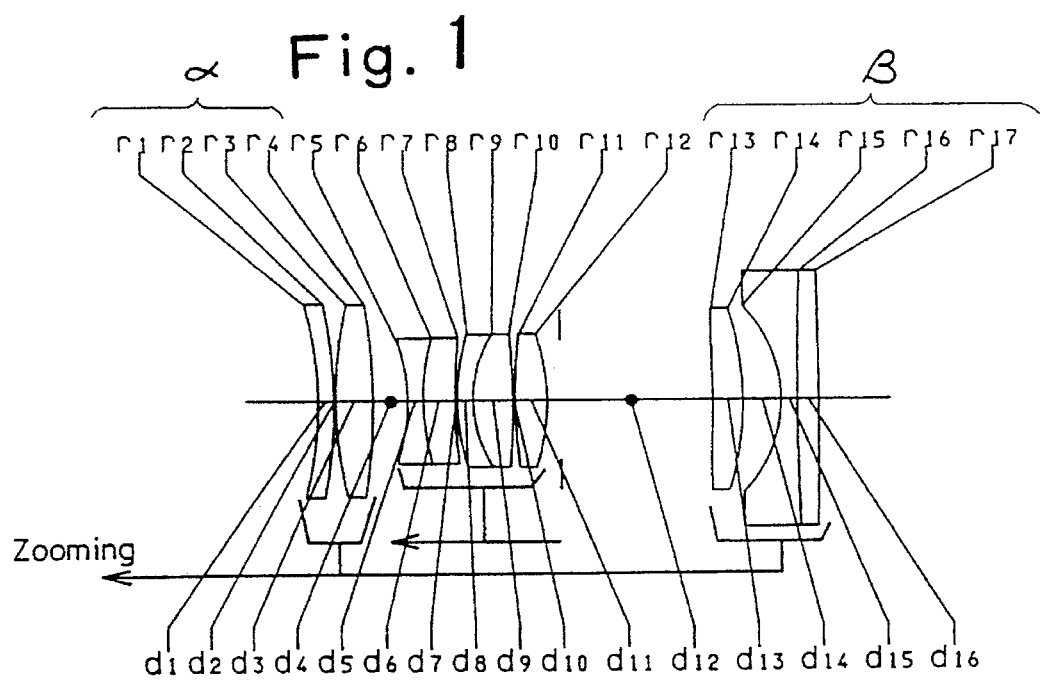
FIG. 1 is a schematic view of a lens arrangement of a zoom lens system, according to a first embodiment of the present invention.

According to a first embodiment of the present invention. FIG. 1 shows a lens arrangement of a zoom lens system having a large variable power.

Figure 5:
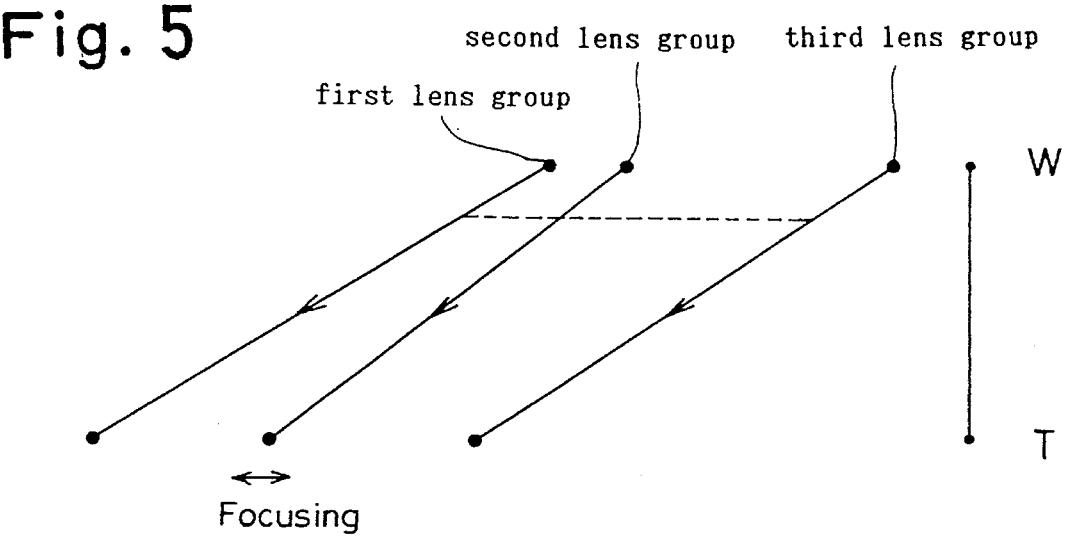
FIG. 5 is an explanatory view of the displacement of lens groups in a zoom lens system shown in FIG. 1, during zooming.

The zoom lens comprises three lens groups in which the first lens group and the third lens group are designated by α and β. FIG. 5 shows a locus of points along which the lens system is moved from the wide-angle extremity W to the telephoto extremity T during the zooming operation. In the first embodiment, the focusing is carried out by the second lens group.

Figure 2:
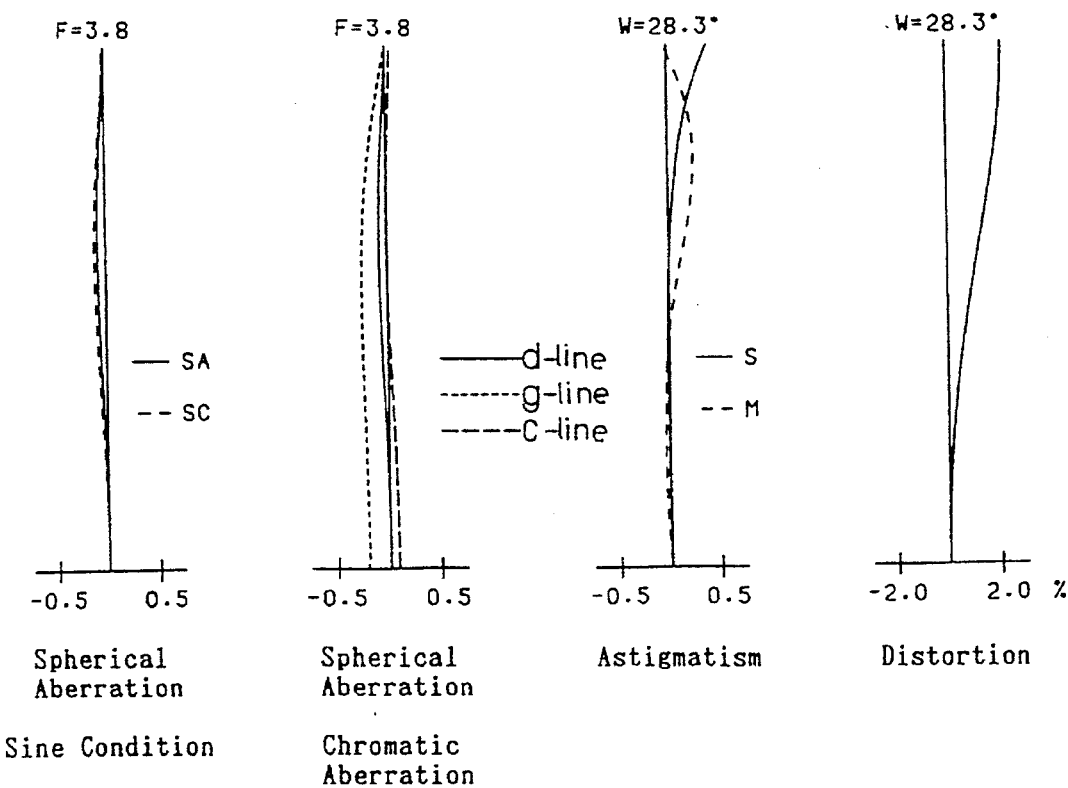
FIGS. 2, 3 and 4 show various aberration diagrams of a zoom lens system shown in FIG. 1.
Figure 3:
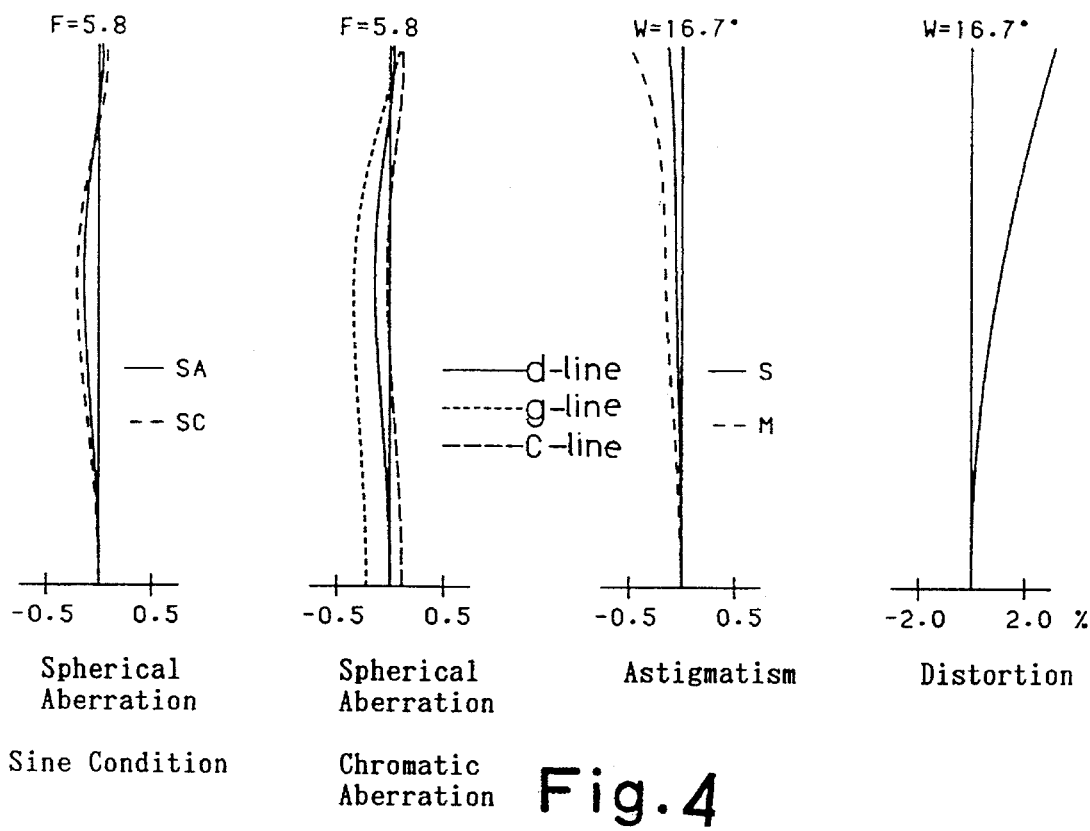
Figure 4:
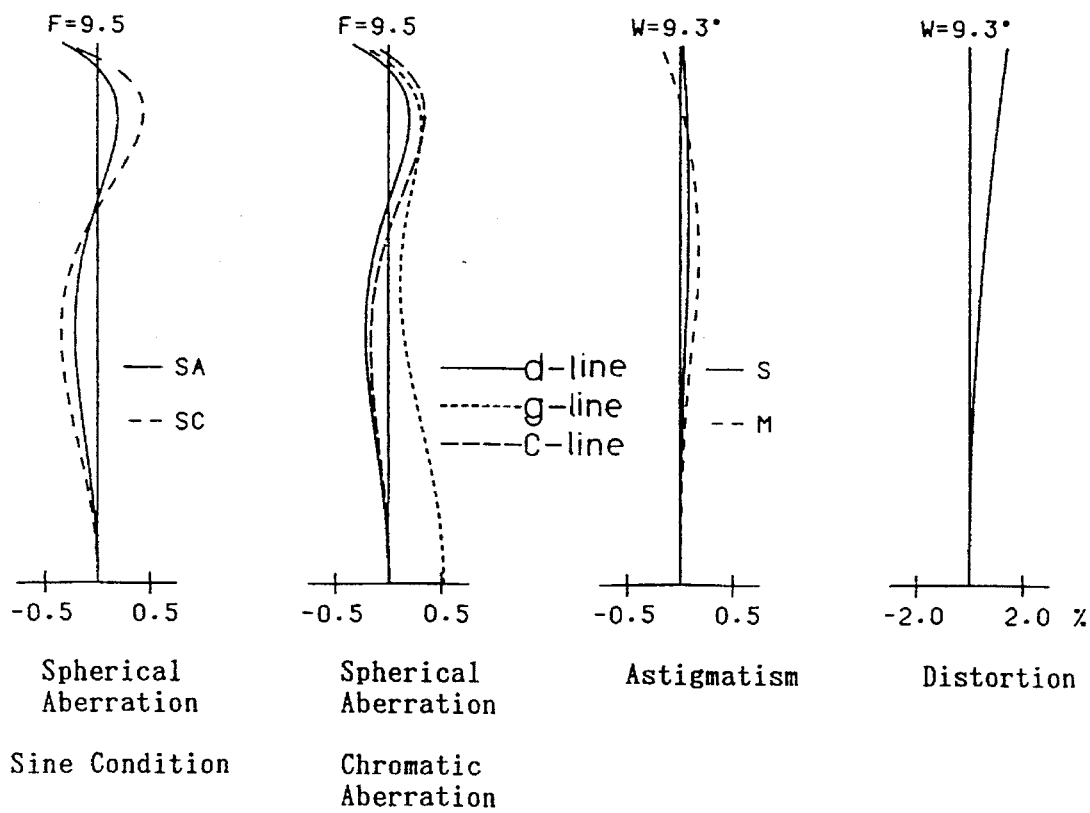

Numerical data of the zoom lens system shown in FIG. 1 is shown in Table 1 below. Various aberrations thereof at different focal lengths are shown in FIGS. 2, 3 and 4, respectively. In FIGS. 2 through 4, "SA" designates the spherical aberration, "SC" the sine condition, "d-line", "g-line" and "c-line" the chromatic aberration, represented by the spherical aberration, at the respective wavelengths, "S" the sagittal ray, and "M" the meridional ray, respectively.

In the Tables and the drawings, "$F_{NO}$" designates the f-number, "F" the focal length, "ω" the half angle of view, "FB" the back-focal distance, "r i" the radius of curvature of each lens surface, "di" the lens thickness or the distance between the lenses, "N" the refractive index, and "ν" the Abbe number, respectively. The shape of the aspheric surface can be generally expressed as follows.

$$X=CY^2/\{1+[1-(1+K)C^2Y^2]^{1/2}\}+A4Y^4+A6Y^6+A8Y^8+A10Y^{10}+\ldots$$

wherein,

Y represents a height above the axis,

X represents a distance from a tangent plane of an aspherical vertex,

C represents a curvature of the aspherical vertex (l/r),

K represents a conic constant,

A4 represents a fourth-order aspherical aberration factor,

A6 represents a sixth-order aspherical aberration factor,

A8 represents a eighth-order aspherical aberration factor,

A10 represents a tenth-order aspherical aberration factor.

TABLE 1

$F_{NO} = 1:3.8–5.8–9.5$
$F = 39.30–70.00–130.00$
$ω = 28.3–16.7–9.3$
$F_B = 9.75–30.72–70.62$

| Surface No. | r | d | N | ν |
| --- | --- | --- | --- | --- |
| 1 | −33.565 | 1.40 | 1.84666 | 23.8 |
| 2 | −45.184 | 0.10 | — | |
| 3 | 38.279 | 3.36 | 1.48749 | 70.2 |
| 4 | −56.478 | 3.11–10.35–15.43 | — | |
| 5 | −16.423 | 1.40 | 1.77250 | 49.6 |
| 6 | 20.970 | 2.84 | 1.80518 | 25.4 |
| 7 | 47.135 | 0.20 | — | |
| 8 | 20.807 | 1.40 | 1.68893 | 31.1 |
| 9 | 11.509 | 3.59 | 1.58913 | 61.2 |
| 10 | −71.744 | 0.20 | — | |
| 11 | 47.275 | 2.93 | 1.58313 | 59.4 |
| 12* | −17.805 | 1.21 | — | |
| Stop | ∞ | 14.04–6.81–1.72 | | |
| 13* | −87.088 | 2.81 | 1.58547 | 29.9 |
| 14 | −27.513 | 3.50 | — | |
| 15 | −12.193 | 1.50 | 1.77250 | 49.6 |
| 16 | 227.340 | 2.00 | 1.80518 | 25.4 |
| 17 | −497.868 | — | — | |

*designates an aspherical surface.

NO.12: K=0.0, A4=0.58624×10⁻⁴, A6=0.10699×10⁻⁶, A8=−0.13007×10⁻⁸, A10=0.0, A12=0.0.

NO.13: K=0.0, A4=0.55463×10⁻⁴, A6=0.23023×10⁻⁷, A8=0.16997×10⁻⁸, A10=0.25153×10⁻¹¹, A12=0.0.

In the first embodiment, the focusing sensitivities $K_1$, $K_2$ and $K_3$ of the first, second and third lens groups are represented by the following equations;

$$K_1 = (m_{T2} \cdot m_{T3})^2 = 4.1 = K\alpha$$

$$K_2 = m_{T3}^2 - K_1 = 13.3$$

$$K_3 = 1 - m_{T3}^2 = '16.4 = K\beta$$

$$K\alpha/K\beta = -0.25$$

$$|K\alpha + K\beta| = 12.3$$

$$m_{T2} = 0.48$$

$$m_{T3} = 4.17 = m_{T\beta}$$

$$m_{T\beta}/m_{w\beta} = 2.82$$

where $m_{T2}$ represents the lateral magnification of the second lens group on the telephoto extremity;

$m_{T3}$ represents the lateral magnification of the third lens group on the telephoto extremity;

$m_{2e}$ represents the lateral magnification of the third lens group on the wide angle extremity.

Second Embodiment

Figure 6:
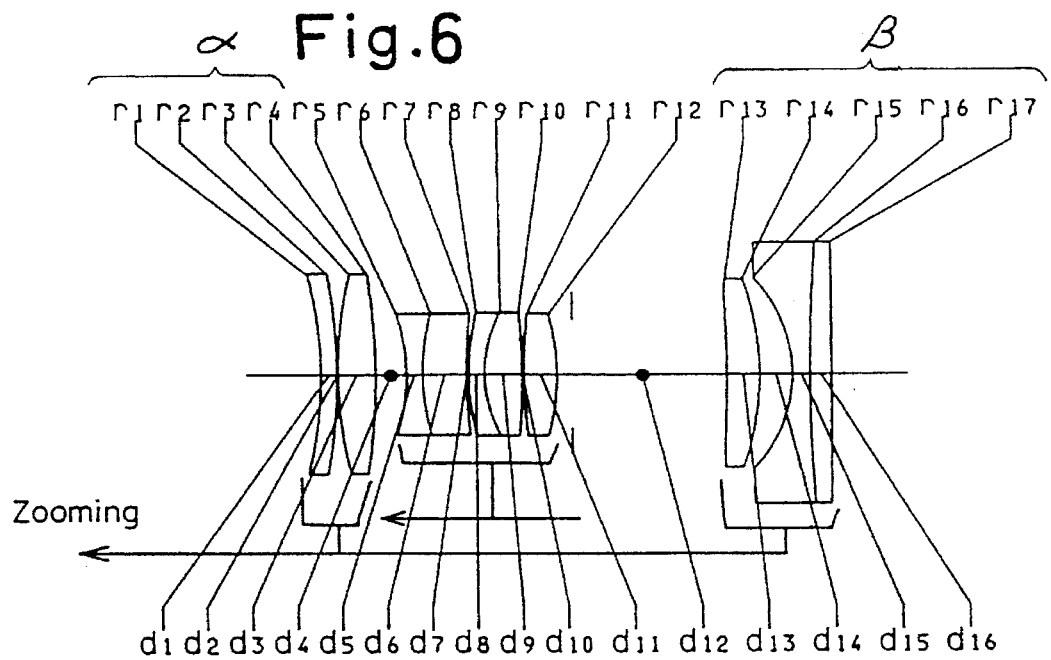
FIG. 6 is a schematic view of a lens arrangement of a zoom lens system, according to a second embodiment of the present invention.

According to a second embodiment of the present invention, FIG. 6 shows a lens arrangement of a zoom lens system having a large variable power.

Figure 10:
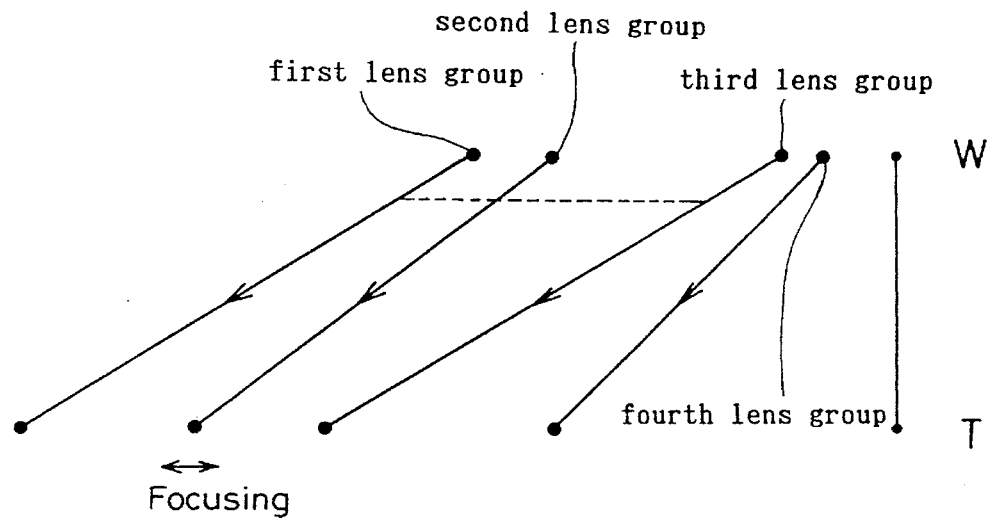
FIG. 10 is an explanatory view of the displacement of lens groups in a zoom lens system shown in FIG. 6, during zooming.

The zoom lens comprises of three lens groups in which the first lens group and the third lens group are designated by α and β. FIG. 10 shows a locus of points along which the lens system is moved from the wide-angle extremity W to the telephoto extremity T during the zooming operation. In the second embodiment, focusing is carried out by the second lens group, similarly to the first embodiment.

Figure 7:
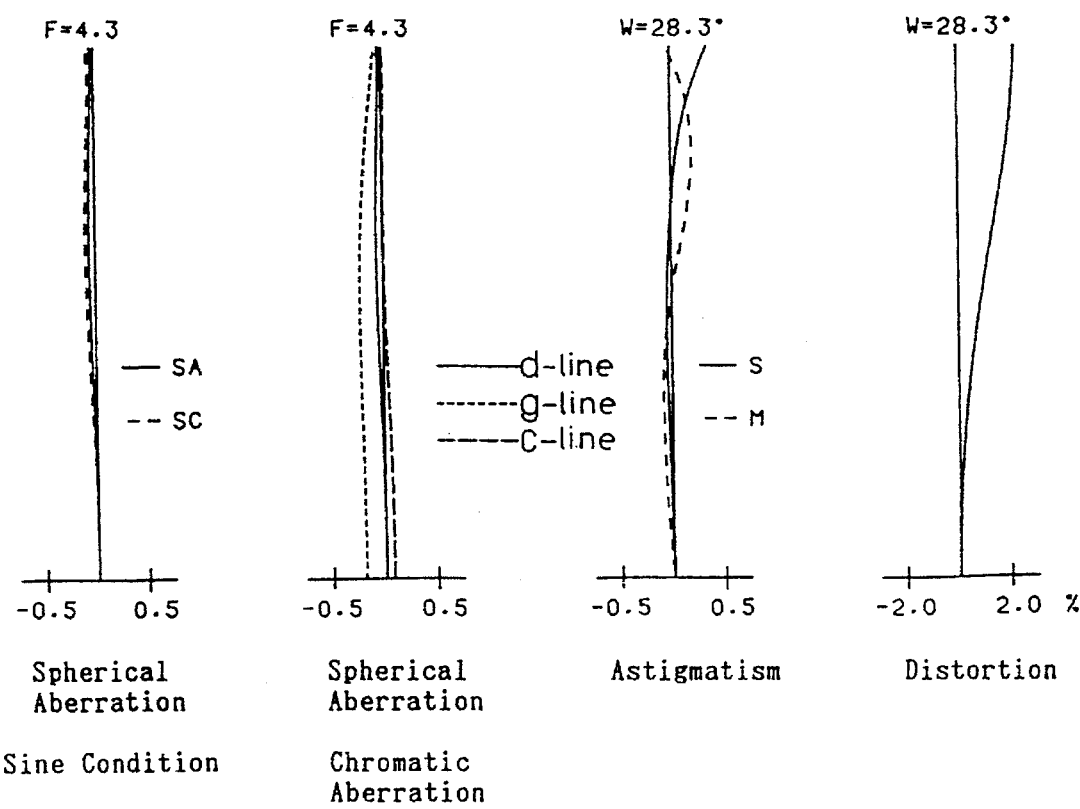
FIGS. 7, 8 and 9 show various aberration diagrams of a zoom lens system shown in FIG. 6.
Figure 8:
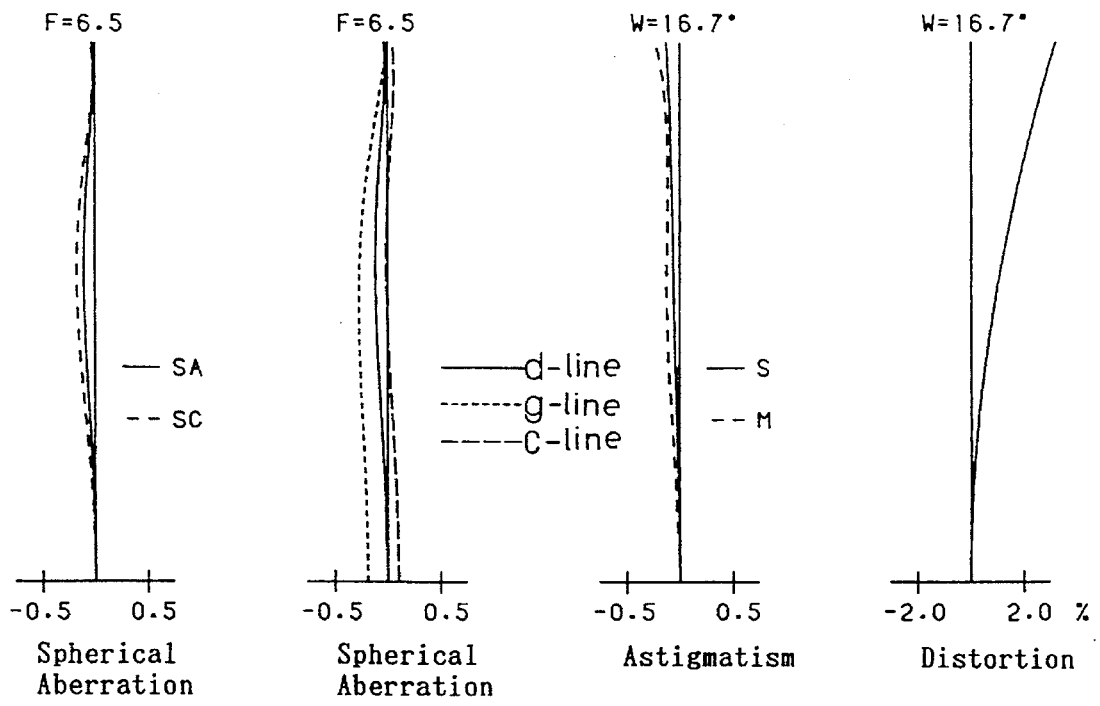
Figure 9:
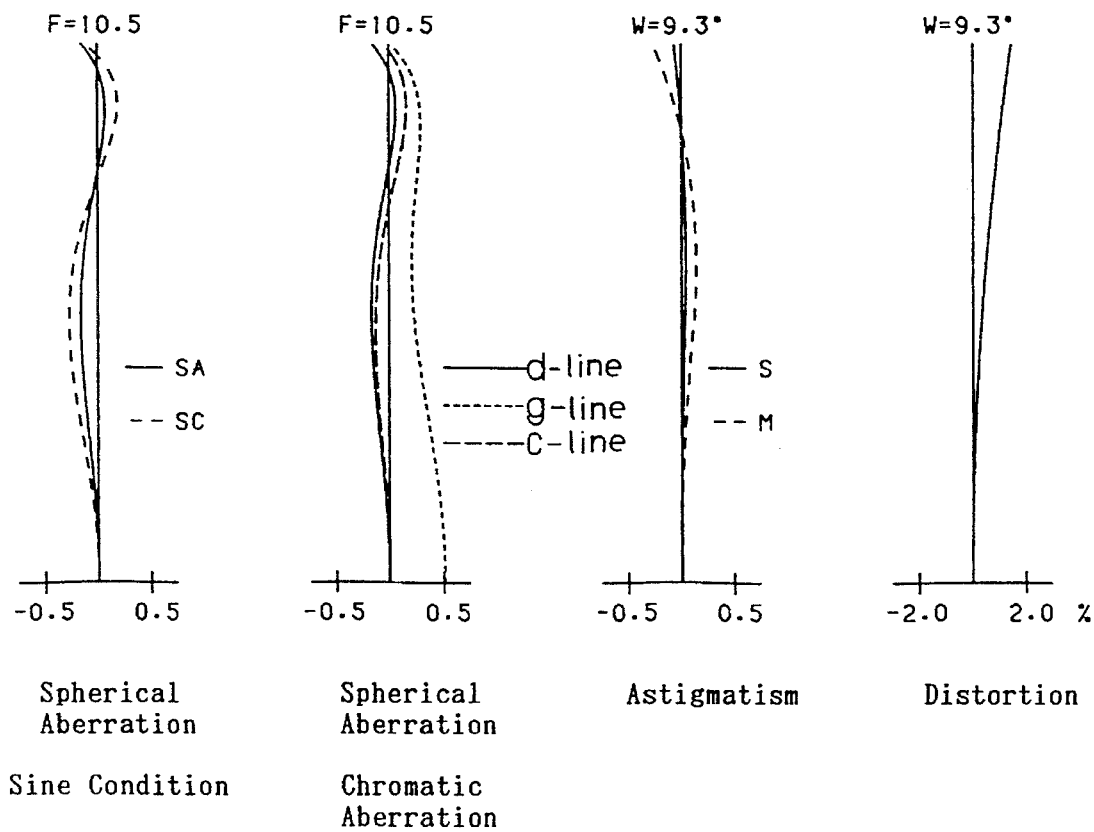

Numerical data of the lens system shown in FIG. 6 is shown in Table 2 below. Diagrams of various aberrations thereof are shown in FIGS. 7, 8 and 9, respectively.

TABLE 2

$F_{NO}$ = 1:4.3–6.5–10.5
F = 39.30–70.00–130.00
ω = 28.3–16.7–9.3
$F_B$ = 10.00–30.81–70.30

| Surface No. | r | d | N | ν |
|---|---|---|---|---|
| 1 | −33.950 | 1.40 | 1.84666 | 23.8 |
| 2 | −47.044 | 0.10 | — | |
| 3 | 35.072 | 3.36 | 1.48749 | 70.2 |
| 4 | −55.208 | 2.76–9.85–14.89 | — | |
| 5 | −16.903 | 1.40 | 1.77250 | 49.6 |
| 6 | 19.405 | 3.89 | 1.80518 | 25.4 |
| 7 | 46.412 | 0.20 | — | |
| 8 | 21.039 | 1.40 | 1.68893 | 31.1 |
| 9 | 11.223 | 3.27 | 1.58913 | 61.2 |
| 10 | −65.898 | 0.20 | — | |
| 11 | 47.239 | 2.93 | 1.58313 | 59.4 |
| 12* | −18.615 | 1.36 | — | |
| Stop | ∞ | 13.87–6.77–1.74 | | |
| 13* | −66.286 | 2.94 | 1.58547 | 29.9 |
| 14 | −23.483 | 2.96 | — | |
| 15 | −11.978 | 1.50 | 1.77250 | `49.6 |
| 16 | 140.775 | 2.00 | 1.80518 | 25.4 |
| 17 | −1193.816 | — | — | |

*designates an aspherical surface.

NO.12: K=0.0, A4=0.52891×10⁻⁴, A6=0.12176×10⁻⁶, A8=−0.23721×10⁻⁸, A10=0.0, A12=0.0.

NO.13: K=0.0, A4=0.57945×10⁻⁴, A6=0.31647×10⁻⁷, A8=0.19401×10⁻⁸, A10=0.28943×10⁻¹¹, A12=0.0.

In the second embodiment, focusing sensitivities $K_1$, $K_2$ and $K_3$ of the first, second and third lens groups are represented by the following equations;

$$K_1 = (m_{T2} \cdot m_{T3})^2 = 4.6 = K\alpha$$

$$K_2 = m_{T3}^2 - K_1 = 13.2$$

$$K_3 = 1 - m_{T3}^2 = -16.8 = K\beta$$

$$K\alpha/K\beta = -0.27$$

$$|K\alpha + K\beta| = 12.2$$

$$m_{T2} = 0.51$$

$$m_{T3} = 4.22 = m_{T\beta}$$

$$m_{w3} = 1.51 = m_{w\beta}$$

$$m_{T\beta/mw\beta} = 2.80$$

Third Embodiment

Figure 11:
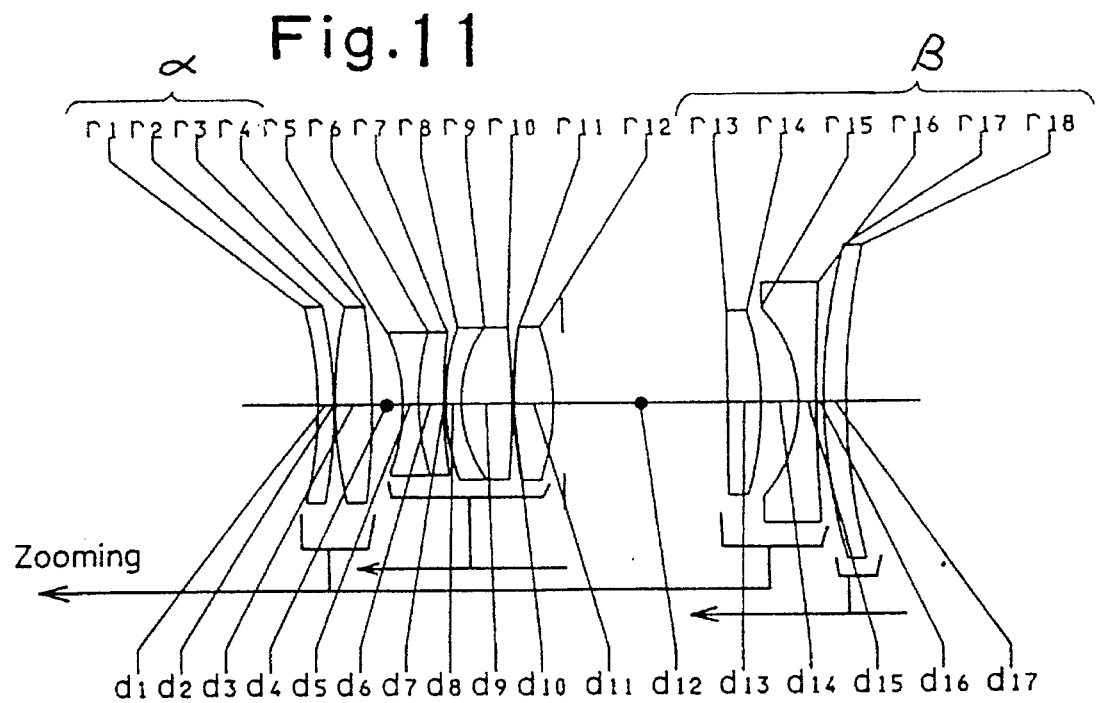
FIG. 11 is a schematic view of a lens arrangement of a zoom lens system, according to a third embodiment of the present invention.

According to a third embodiment of the present invention, FIG. 11 shows a lens arrangement of a zoom lens system having a large variable power.

Figure 15:
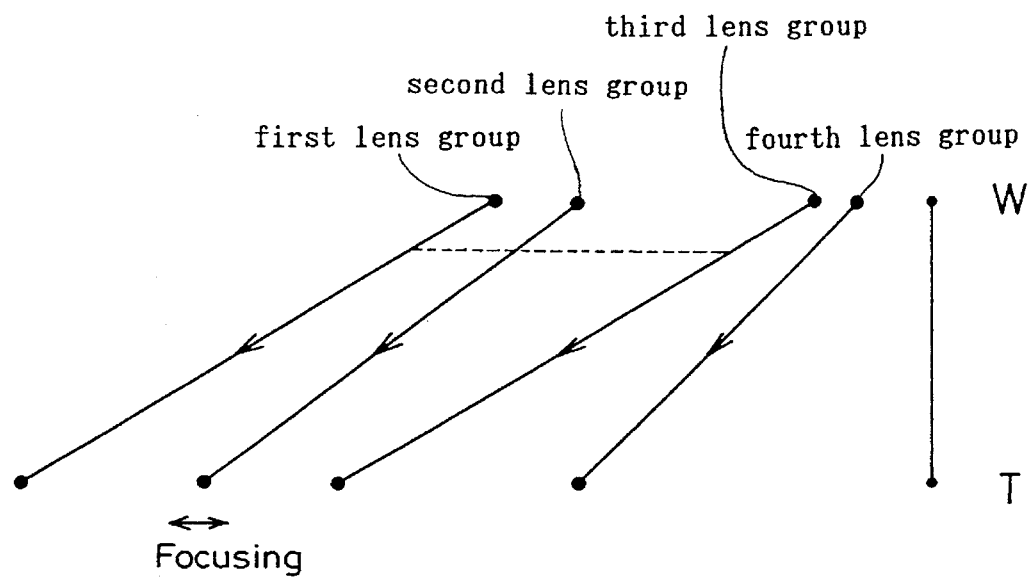
FIG. 15 is an explanatory view of the displacement of lens groups in a zoom lens system shown in FIG. 11, during zooming.

The zoom lens comprises four lens groups in which the first lens group and the third lens group are designated by α and β. FIG. 15 shows a locus of points along which the lens system is moved from the wide-angle extremity W to the telephoto extremity T during zooming operation. In the third embodiment, the focusing is carried out by the second lens group.

Figure 12:
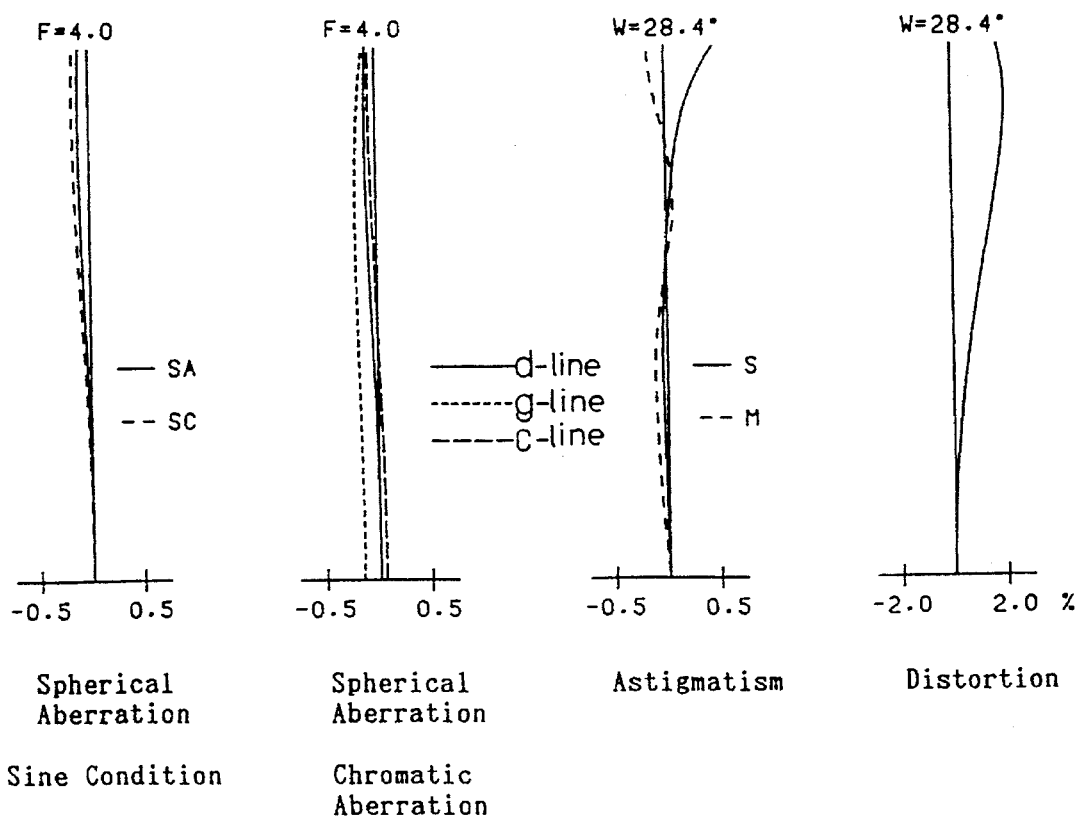
FIGS. 12, 13 and 14 show various aberration diagrams of a zoom lens system shown in FIG. 11.
Figure 13:
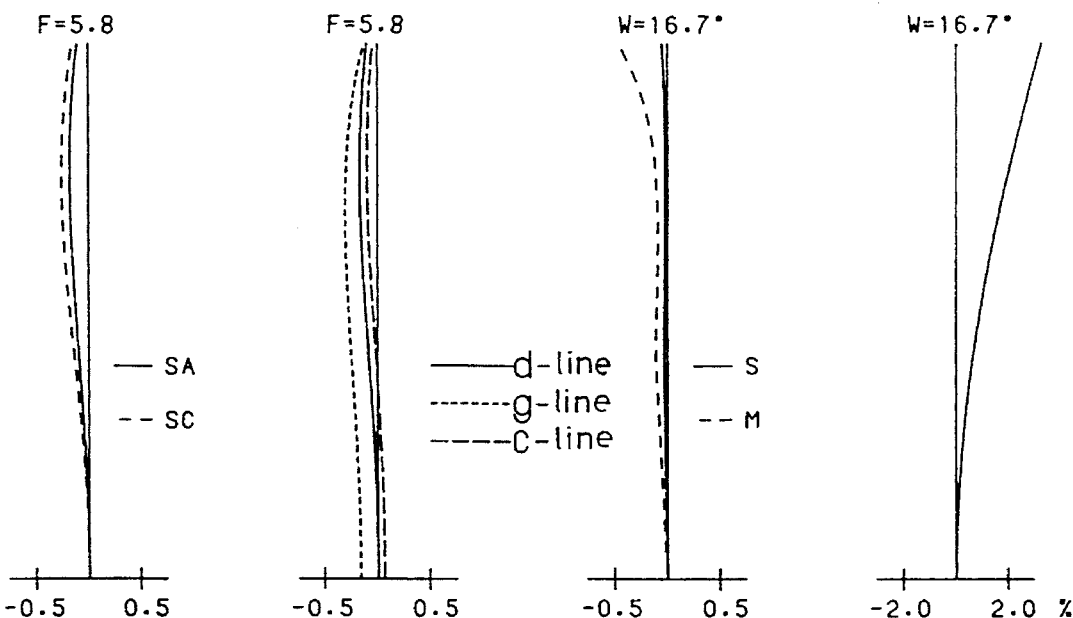
Figure 14:
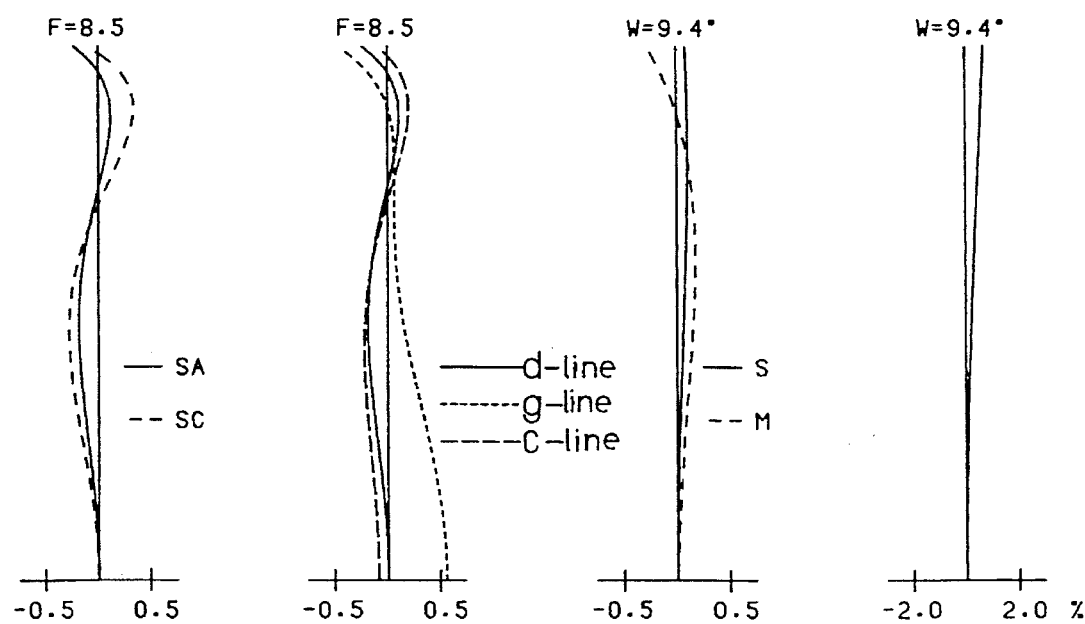

Numerical data of the lens system shown in FIG. 11 is shown in Table 3 below. Various aberrations thereof at different focal lengths are shown in FIGS. 12, 13, and 14, respectively.

TABLE 3

$F_{NO}$ = 1:4.0–5.8–8.5
F = 39.30–70.00–130.00
ω = 28.4–16.7–9.4
$F_B$ = 9.03–24.65–47.56

| Surface No. | r | d | N | ν |
|---|---|---|---|---|
| 1 | −35.619 | 1.40 | 1.84666 | 23.8 |
| 2 | −44.207 | 0.10 | — | |
| 3 | 40.948 | 3.36 | 1.48749 | 70.2 |
| 4 | −63.617 | 2.69–10.23–15.46 | — | |
| 5 | −16.878 | 1.40 | 1.77250 | 49.6 |
| 6 | 21.666 | 2.23 | 1.80518 | 25.4 |
| 7 | 45.290 | 0.20 | — | |
| 8 | 20.528 | 1.40 | 1.68893 | 31.1 |
| 9 | 11.947 | 4.45 | 1.58913 | 61.2 |
| 10 | −73.237 | 0.20 | — | |
| 11 | 50.577 | 3.41 | 1.59240 | 68.3 |
| 12* | −18.709 | 0.90 | — | |
| Stop | ∞ | 14.66–7.11–1.89 | | |
| 13* | −158.193 | 3.02 | 1.58547 | 29.9 |
| 14 | −28.623 | 3.37 | — | |
| 15 | −12.699 | 1.50 | 1.77250 | 49.6 |
| 16 | 177.098 | 0.70–6.02–24.92 | — | |
| 17 | 50.479 | 2.00 | 1.80518 | 25.4 |
| 18 | 59.769 | — | | |

*designates an aspherical surface.

NO.12: $K=0.0$, $A4=0.53919\times10^{-4}$, $A6=0.53053\times10^{-7}$, $A8=-0.22544\times10^{-9}$, $A10=0.0$, $A12=0.0$.

NO.13: $K=0.0$, $A4=0.50180\times10^{-4}$, $A6=0.10199\times10^{-7}$, $A8=0.16505\times10^{-9}$, $A10=-0.18065\times10^{-11}$, $A12=0.0$.

In the third embodiment, the focusing sensitivities $K_1$, $K_2$, $K_3$ and $K_4$ of the first, second, third and fourth lens groups are represented by the following equations;

$$K_1=(m_{T2}\cdot m_{T3}\cdot m_{T4})^2=4.1=K\alpha$$

$$K_2=(m_{T3}\cdot m_{T4})^2-K_1=12.2$$

$$K_3=m_{T4}^2-(m_{T3}\cdot m_{T4})^2=-15.5=K\beta$$

$$K_4=1-m_{t4}^2=0.3$$

$$K\alpha/K\beta=-0.26$$

$$|K\alpha+K\beta|=11.4$$

$$m_{T2}=0.50$$

$$m_{T3}=4.73=m_{T\beta}$$

$$m_{T4}=0.85$$

$$m_{w3}=1.50=m_{w\beta}$$

$$m_{T\beta}/m_{w\beta}=3.15$$

Fourth Embodiment

Figure 16:
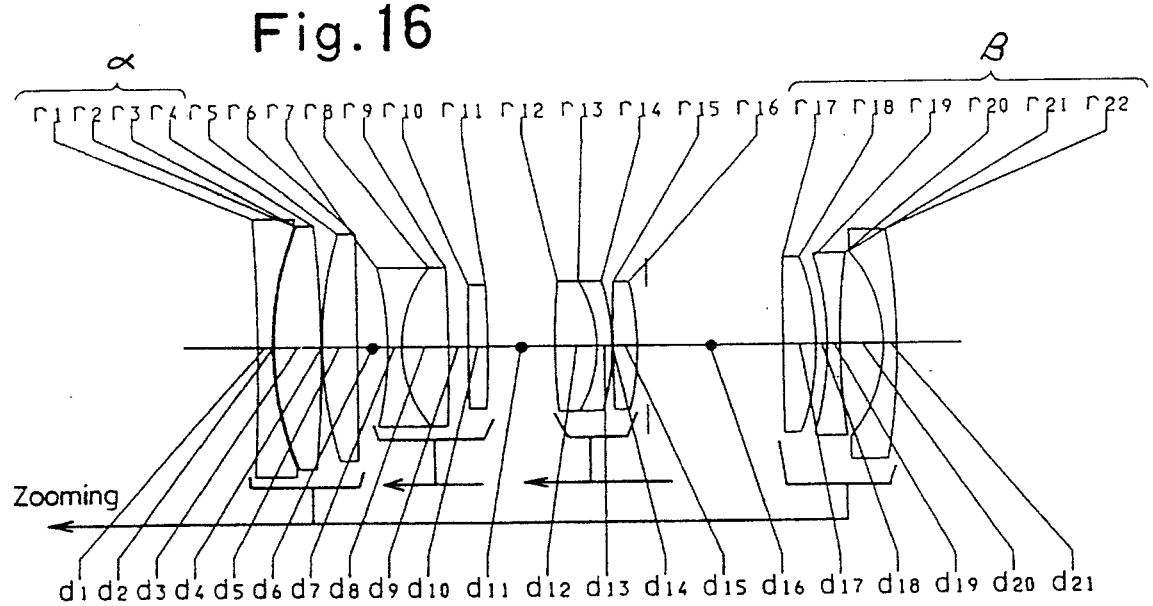
FIG. 16 is a schematic view of a lens arrangement of a zoom lens system, according to a fourth embodiment of the present invention.

According to a fourth embodiment of the present invention. FIG. 16 shows a lens arrangement of a zoom lens system having a large variable power.

Figure 20:
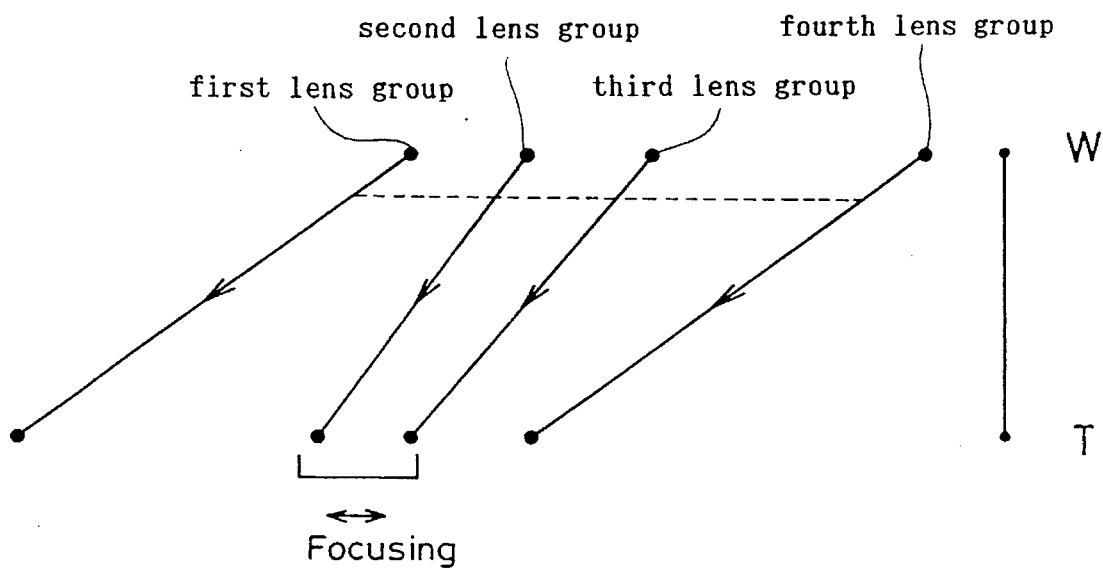
Figure 17:
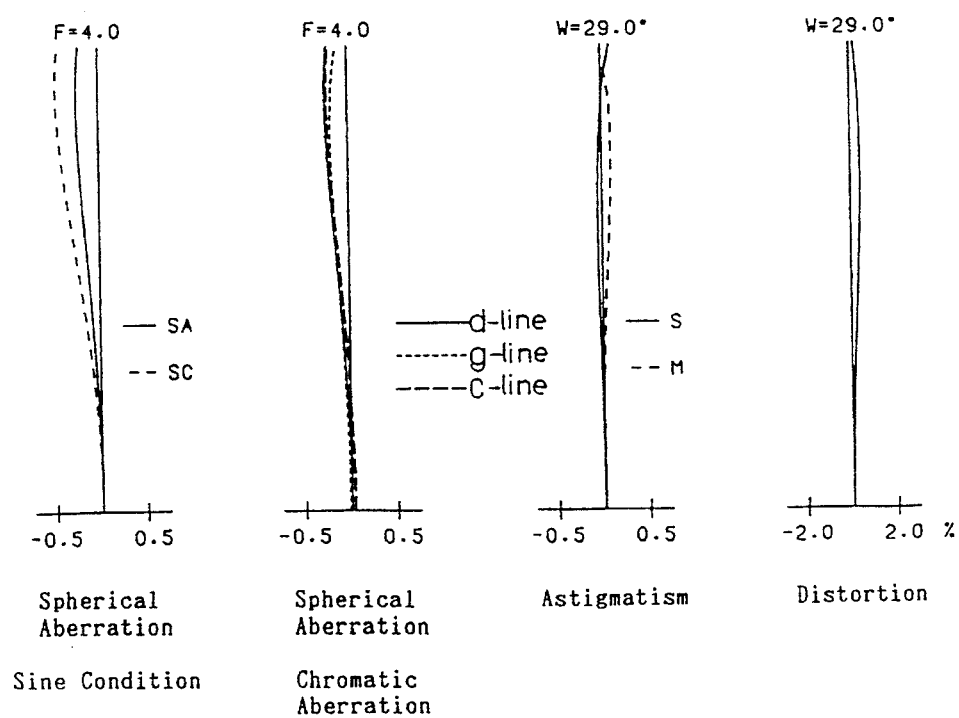
FIGS. 17, 18 and 19 show various aberration diagrams of a zoom lens system shown in FIG. 16; and, FIG. 20 is an explanatory view of the displacement of lens groups in a zoom lens system shown in FIG. 16, during zooming.
Figure 18:
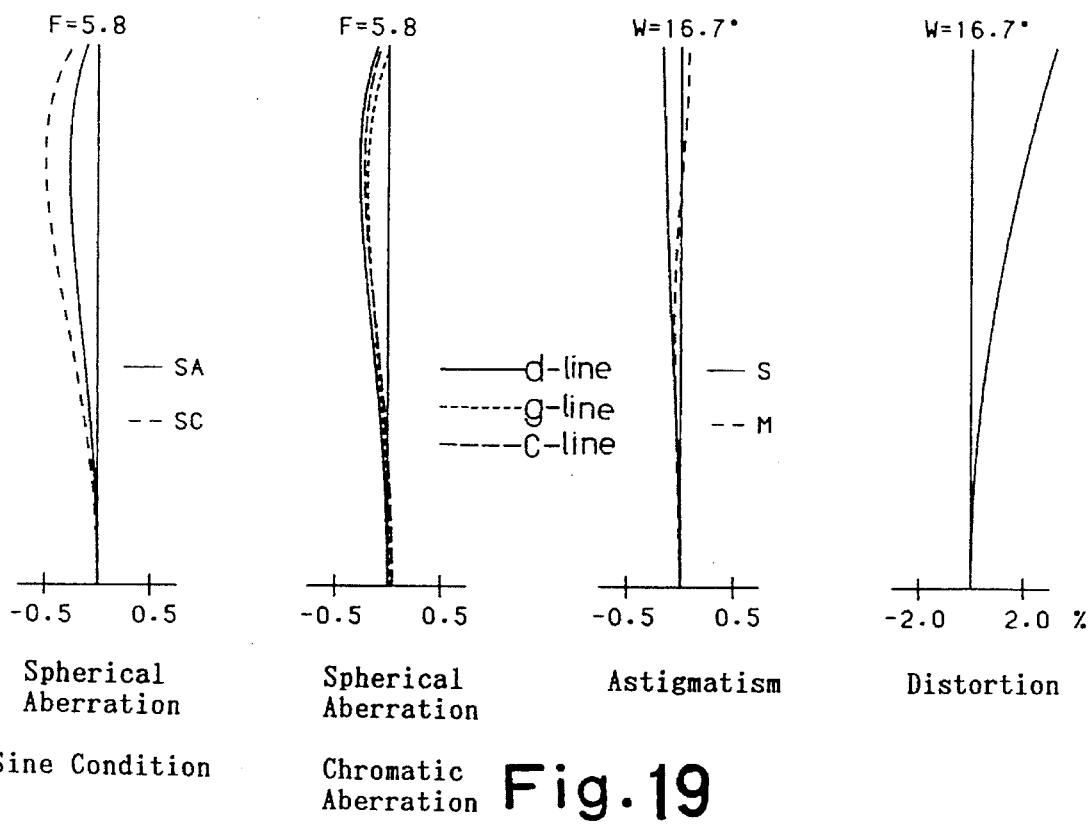
Figure 19:
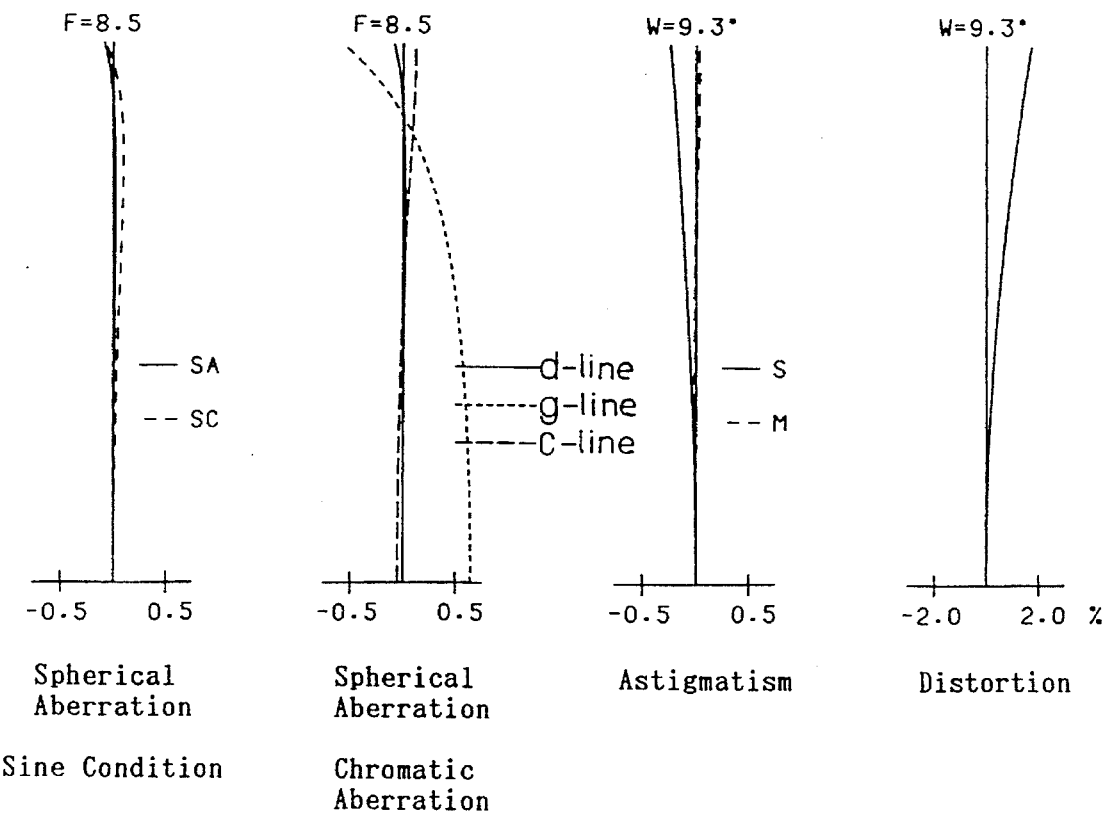

The zoom lens comprises four lens groups in which the first lens group and the fourth lens group are designated by $\alpha$ and $\beta$. FIG. 20 shows a locus of points along which the lens system is moved from the wide-angle extremity W to the telephoto extremity T during the zooming operation. In the fourth embodiment, the focusing is carried out by the second and third lens groups which are also moved together. Numerical data of the lens system shown in FIG. 16 is shown in Table 4 below. Various aberrations thereof at different focal lengths are shown in FIGS. 17, 18, and 19, respectively.

TABLE 4

$F_{NO} = 1:4.0$–5.8–8.5
$F = 39.00$–70.0–130.4
$\omega = 29.0$–16.7–9.3
$F_B = 8.55$–26.37–59.09

| Surface No. | r | d | N | ν |
| --- | --- | --- | --- | --- |
| 1 | −219.734 | 1.50 | 1.83400 | 37.2 |
| 2 | 31.770 | 0.19 | — | |
| 3 | 31.271 | 4.94 | 1.67000 | 57.4 |
| 4 | −126.618 | 0.10 | — | |
| 5 | 38.958 | 3.59 | 1.64000 | 60.1 |
| 6 | −1402.713 | 3.10–11.58–18.31 | — | |
| 7 | −31.086 | 1.40 | 1.83481 | 42.7 |
| 8 | 12.556 | 4.77 | 1.74077 | 27.8 |
| 9 | −180.461 | 2.00 | — | |
| 10 | 231.685 | 2.00 | 1.49176 | 57.4 |
| 11 | −110.377 | 6.72–5.31–3.97 | — | |
| 12 | 65.614 | 4.28 | 1.48749 | 70.2 |
| 13 | −12.446 | 1.50 | 1.80518 | 25.4 |
| 14 | −22.350 | 0.10 | — | |
| 15 | 166.897 | 2.50 | 1.48749 | 70.2 |
| 16 | −27.256 | 1.00 | — | |
| Stop | ∞ | 13.97–6.90–1.50 | | |
| 17 | 744.057 | 3.37 | 1.80518 | 25.4 |

TABLE 4-continued

| 18 | −25.515 | 1.17 | — | |
| --- | --- | --- | --- | --- |
| 19 | −30.522 | 1.30 | 1.83400 | 37.2 |
| 20 | 67.939 | 4.55 | — | |
| 21 | −14.309 | 1.40 | 1.77250 | 49.6 |
| 22 | −66.970 | — | | |

In the fourth embodiment, focusing sensitivities $K_1$, $K_2$, $K_3$ and $K_4$ of the first, second, third and fourth lens groups are represented by the following equations;

$$K_1=(m_{T2}\cdot m_{T3}\cdot m_{T4})^2=3.5=K\alpha$$

$$K_2=(m_{T3}\cdot m_{T4})^2-K_1=-3.4$$

$$K_3=m_{T4}^2-(m_{T3}\cdot m_{T4})^2=13.9$$

$$K_4=1-m_{T4}^2=-13.0=K\beta$$

$$K\alpha/K\beta=-0.27$$

$$|K\alpha+K\beta|=9.5$$

$$m_{T2}=-5.50$$

$$m_{T3}=-0.097$$

$$m_{T4}=3.75=m_{T\beta}$$

$$m_{w4}=1.42=m_{w\beta}$$

$$m_{T\beta}/m_{w\beta}=2.64$$

Values of the formulae (1) through (5) in the first, second, third and fourth embodiments are shown in Table 5 below.

TABLE 5

| | embodiment 1 | embodiment 2 | embodiment 3 | embodiment 4 |
| --- | --- | --- | --- | --- |
| formula (1) | 16.4 | 16.8 | 15.5 | 13.0 |
| formula (2) | −0.25 | −0.27 | −0.26 | −0.27 |
| formula (3) | 12.3 | 12.2 | 11.4 | 9.5 |
| formula (4) | 4.17 | 4.22 | 4.73 | 3.75 |
| formula (5) | 2.82 | 2.80 | 3.15 | 2.64 |

As can be seen from Table 5 above, each of the four embodiments satisfy the requirements defined by formulae (1) through (5). Moreover, according to the present invention, the zoom ratio is approximately 3, and the aberrations are correctly compensated.

As may be understood from the above discussion, according to the present invention, a physically small zoom lens system with a large variable power which is comprised of three or more lens groups can be obtained.

I claim:

1. A zoom lens system comprising: at least three lens groups having a zoom ratio that is greater than 3.0; two of said lens groups are moved together, keeping the distance between said two lens groups constant during a zooming operation; a lens group α of said two lens groups has a small degree of contribution to a variation of magnification by said zoom lens system compared to that of a lens group β of said two lens groups; and said lens groups α and β have focusing sensitivities Kα and Kβ of different signs satisfying the following relationships:

$$12<|K\beta| \tag{1}$$

$$-0.5<K\alpha/K\beta<-0.1 \tag{2}$$

wherein "$K\alpha$" represents a focusing sensitivity of said lens group $\alpha$ at a telephoto extremity; and "$K\beta$" represents a focusing sensitivity of said lens group $\beta$ at a telephoto extremity position, respectively.

2. A zoom lens system according to claim 1, said lens groups $\alpha$ and $\beta$ further satisfy the following relationship;

$$9<|K\alpha+K\beta|<20$$

3. A zoom lens system according to claim 2, said lens group $\beta$ satisfies the following relationships:

$$3.3<m_T\beta<6 \tag{4}$$

$$2.5<m_T\beta/<m_w\beta<4 \tag{5}$$

wherein "$m_T\beta$" represents a lateral magnification by said lens group $\beta$ at said telephoto extremity; and "$m_w\beta$" represents a lateral magnification by said lens group $\beta$ at a wide angle extremity.

4. A zoom lens system according to claim 1, focusing is carried out by a lens group other than said lens group $\alpha$ or said lens group $\beta$.

5. A zoom lens system according to claim 2, focusing is carried out by a lens group other than said lens group $\alpha$ or said lens group $\beta$.

6. A zoom lens system according to claim 1, said lens system is supported on compact camera.

7. A zoom lens system according to claim 2, said lens system is supported on a compact camera.

* * * * *

UNITED STATES PATENT AND TRADEMARK OFFICE
CERTIFICATE OF CORRECTION

PATENT NO. : 5,572,365
DATED : November 5, 1996
INVENTOR(S) : Takayuki ITO

It is certified that error appears in the above-indentified patent and that said Letters Patent is hereby corrected as shown below:

On the cover, in section [57], "ABSTRACT", line 12, change "K$\alpha$/K$\alpha$" to ---K$\alpha$/K$\beta$---.

At column 9, line 7 (claim 2, line 2), change "relationship;" to ---relationship:---.

At column 9, line 10 (claim 2, line 3), insert ---(3)---.

At column 10, line 13 (claim 6, line 2), before "compact camera" insert ---a---.

Signed and Sealed this

Fifteenth Day of April, 1997

Attest:

BRUCE LEHMAN

*Attesting Officer*   *Commissioner of Patents and Trademarks*